United States Patent Office 3,755,412
Patented Aug. 28, 1973

3,755,412
ALKYLATION OF ACETONITRILES
Lubomyr B. Taranko, Scotch Plains, N.J., and Robert H. Perry, Jr., West Concord, Mass., assignors to Esso Research and Engineering Company
No Drawing. Continuation-in-part of abandoned application Ser. No. 635,350, May 2, 1967. This application July 7, 1969, Ser. No. 839,693
Int. Cl. C07c *121/02, 121/66*
U.S. Cl. 260—465 R                12 Claims

ABSTRACT OF THE DISCLOSURE

This invention relates to alkali metal salts of organonitrile carbanions, alkylated organonitrile hydrocarbons and to a process for their formation. The alkali metal salt compositions are prepared by reacting an active organic methylene compound containing at least one nitrile substituent with an aqueous solution of an alkali metal base in the presence of a diorgano sulfoxide. The alkylated compositions can be prepared by reacting the alkali metal salts of the organonitrile carbanions with an organohalide. Alternatively, the alkylated compositions can be prepared in a one-step operation by reacting the organonitrile composition with aqueous alkali metal base and organohalide in the presence of a diorgano sulfoxide, preferably dimethyl sulfoxide.

CROSS-REFERENCE TO RELATED APPLICATION

This application is a continuation-in-part of Ser. No. 635,350, filed May 2, 1967 now abandoned in the names of Lubomyr B. Taranko and Robert H. Perry, Jr.

BACKGROUND OF THE INVENTION

(1) Field of the invention

This invention is directed to alkylated organonitrile compositions, alkali metal salts of organonitrile carbanions and processes for their formation. The alkali metal salt products are formed by contacting an activated organonitrile compound with aqueous alkali metal base in the presence of diorgano sulfoxide compound. The alkylated nitrile compounds can be secured by reacting the alkali metal salt materials with an organohalide or, alternatively, by conducting the basic alkali metal salt formation reaction in the further presence of an organohalide.

Description of the prior art

In the prior art the most widely used method for forming alkali metal salts of organonitriles having an active hydrogen on the carbon atom alpha to the nitrile group consisted of heating the nitrile with a strong base, such as alkali metal amide, alkali metal alkoxide, sodium hydride, phenyl sodium or triphenyl sodium. The alkylated nitriles were secured by reacting the resultant alkali salt with an organic halide. Usually the alkylating agents are alkyl bromides or alkyl iodides; the alkyl chlorides are used less frequently because of their lower reactivity.

The most common solvents used for these reactions were liquid ammonia, alcohol, ethers and aromatic hydrocarbons. The nature of the classical alkylation procedure is such that a completely anhydrous medium must be maintained throughout both reactions. Even though the prior art techniques frequently gave the desired products in high yields, their commercial application gave rise to considerable difficulties, such as the necessity of employing dangerous reagents, inflammable solvents, and partly, very low temperatures.

The following are examples of where an alkali metal hydroxide was used as the condensation agent:

(1) V. Meyer, Ann. 250, 123 (1888)—Phenylacetonitrile was alkylated with methyl iodide and powdered sodium hydroxide. The reaction was violent and difficult to control, and only low selectivities were obtained. In addition, the reaction was applicable to liquid reactants only.

(2) Zelinsky and Feldmann, Ber. 22, 3290 (1889)—Alkylation of phenylacetonitrile with methylene iodide in the presence of powdered sodium hydroxide in the liquid phase gives 2,4-diphenyl glutaronitrile.

(3) J. Jarousse, Compt. rend., 232, 1424 (1951), M. Makosza, B. Serafinowa, Roczniki Chem., 39, 1805 (1965). These references indicate that nitriles containing activated methylene groups can be alkylated with organic halides and aqueous alkaline hydroxides, however, only in presence of catalytic amounts of a nitrogen base. In the absence of the catalyst, no reaction is said to take place.

SUMMARY OF THE INVENTION

In accordance with the present invention, alkali metal salts of organonitrile carbanions (enolates) are produced by reacting certain specific types of organonitrile compounds with aqueous alkali metal base in the presence of a diorgano sulfoxide solvent material. The invention is also directed to alkylated nitrile compounds and processes for their production. More particularly, alkylated nitrile compounds are prepared by reacting an alkali metal salt of an organonitrile carbanion with an organohalide or, more preferably, in a one-step process wherein an activated organonitrile is reacted with aqueous alkali metal base and organohalide in the presence of a diorgano sulfoxide solvent. Most preferably, the base material is aqueous alkali metal hydroxide and the solvent a lower dialkyl sulfoxide.

With the present process, alkali metal salts of organonitrile carbanions and alkylated activated organonitriles can be prepared without the use of dangerous reagents or inflammable solvents. Additionally, the process does not require the use of anhydrous reaction conditions or reduced pressures and elevated pressures. Lastly, the process is non-catalytic and alkylated materials are conveniently secured using organochloride reagents in preference over the corresponding (and more expensive) bromo and iodo derivatives.

The overall reactions contemplated by the instant invention are illustrated in the equations below.

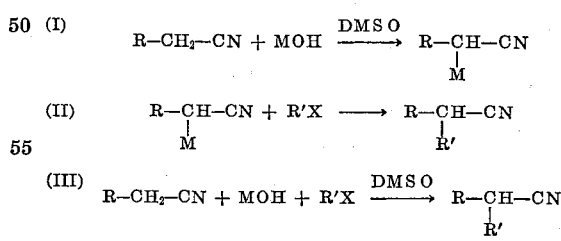

In Equation I is shown the basic reaction for the formation of an alkali salt of an organonitrile carbanion. It should be understood that if the molar ratio of alkali metal hydroxide to nitrile compound were greater than about 1:1, a portion of the product recovered would be material wherein both hydrogen atoms of the carbon atom located alpha to the nitrile group would be replaced with alkali metal cations. In Equation II is demonstrated the reaction of the alkali metal salt with an organo halide compound to arrive at an alkylated nitrile material. Equation III shows the one-step process for the formation of alkylated nitrile materials through the reaction of an organonitrile with an alkali metal hydroxide and an organohalide in the presence of a diorgano sulfoxide solvent such as dimethyl sulfoxide (DMSO).

Many different types of organonitrile compounds can be employed as the starting material in the instant process. All usable nitrile compositions contain methylene radicals having 1 or 2 abstractable hydrogen atoms positioned alpha to the nitrile radical. It is necessary that an electron withdrawing or an activating group be positioned beta to the nitrile radical of the composition. Useful organonitrile compounds possess the general formulae:

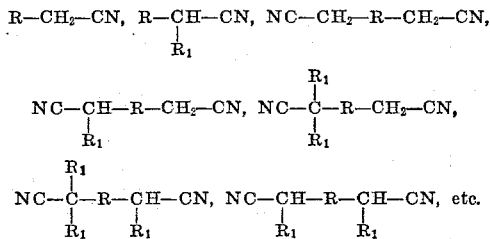

In general, applicable nitrile reagents contain at least one functional unit having the general formulae:

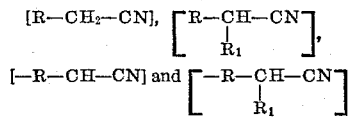

In the above general formulas, the symbol R designates a monovalent or divalent electron withdrawing or activating group. In general, the symbol R designates (a) a nitrile radical; (b) a phenyl, phenylene or naphthalene or naphthyl radical; (c) an alkylaryl radical having from 7 to 18 carbon atoms, preferably 7 to 10 carbon atoms, e.g. methylphenyl, diethylphenyl, ethylbutylphenyl, n-octylphenyl, dibutylnaphthyl, etc.; (d) a halophenyl or halophenylene radical having from 6 to 12 carbon atoms, preferably from 6 to 9 carbon atoms, e.g. halophenyl, dibromophenyl, 2 - chloro-4-t-butylphenyl, 2,4,5-trichlorophenyl, 2-ethyl-4-iodophenyl, etc.; (e) alkoxyaryl radicals having from 7 to 12, preferably from 7 to 10 carbon atoms, such as dimethoxyphenyl, 2-ethyl-4-methoxyphenyl, dipropoxyphenyl, 2-butoxy-5-methoxyphenyl, etc.; (f) 3-pyridyl radicals; and (g) 2-thienyl radicals.

The symbol $R_1$ as employed in the above formulas represents a substituted or unsubstituted hydrocarbon radical having from 1 to 22, preferably 1 to 12 carbon atoms. Preferably, $R_1$ designates (a) a straight chain or branched chain monovalent acyclic alkyl radical having from 1 to 18, preferably 1 to 8 carbon atoms, e.g. methyl, propyl, t-butyl, 3,3-diethylhexyl, 2,3-dimethylbutyl, etc.; (b) $C_3$–$C_{12}$ monovalent alicyclic alkyl radical, e.g. cyclobutyl, cyclohexyl, diethyl cyclohexyl, etc.; (c) a monovalent straight chain, branched chain or alicyclic alkylene or acetylenic radical having from 3 to 18, preferably 3 to 12 carbon atoms, such as propenyl, pentenyl, propargyl, cyclohexenyl, 5-methylene-2-norbornadienyl, dicyclopentadienyl, etc.; (d) aralkyl radicals having from 7 to 20, preferably 7 to 12 carbon atoms, such as benzyl, dimethyl benzyl, ethylene phenyl, 2-methyl-4-t-butylbenzyl, etc.; (e) alkylaryl radicals having from 7 to 20, preferably 7 to 12 carbon atoms, such as phenylethyl, tolyl, ethylbutylphenyl, dimethylnaphthyl, di-t-butylphenyl, etc.; (f) omega-N,N-dialkylaminoalkyl radicals having from 2 to 20, preferably 2 to 10 carbon atoms; and (g) beta-diethylaminoalkyl radicals having from 4 to 16, preferably 4 to 10 carbon atoms.

Representative, nonlimiting examples of useful organonitrile compounds include: phenylacetonitrile, diphenylacetonitrile, p-aminophenylacetonitrile, biphenylacetonitrile, 3-bromo-phenylacetonitrile, cyclohexylphenylacetonitrile, 2,6 - dichlorophenylacetonitrile, (3,4-dimethoxyphenyl)-acetonitrile, alpha-(2 - dimethylaminoethyl)-benzyl cyanide, m-fluorophenylacetonitrile, 4-hydroxybenzylcyanide, 4-methoxybenzyl cyanide, 2-methylbenzylcyanide, p-nitrobenzylcyanide, phenyl - 2 - pyridyl-acetonitrile, 3-pyridylacetonitrile, alpha-phenylbutyronitrile, p-phenylenediacetonitrile, alpha,alpha'-dimethyl-p-phenylenediacetonitrile, alpha,alpha,alpha'-trimethyl-p-phenylene-diacetonitrile, alpha-naphthylacetonitrile, etc.

As noted earlier, an aqueous alkali metal base, preferably an aqueous alkali metal hydroxide material, is employed as a coreactant in the process for forming the alkali metal salts of the organonitrile carbanion. Desirably, the reaction is conducted in the absence of a nitrogen containing base. Preferred materials include sodium hydroxide, potassium hydroxide and lithium hydroxide. Sodium hydroxide is the preferred reagent material since it is readily available in large quantities at relatively low cost. The aqueous alkali metal base materials preferably contain from 10 to 95, preferably 30 to 70 weight percent water, based on water and base.

Many different types of organohalide materials can be used to introduce hydrocarbon substitution into the nitrile molecule. In general, compositions possessing the formulae: R'X, X—(CH$_2$)$_n$—X, R'(X)$_2$,

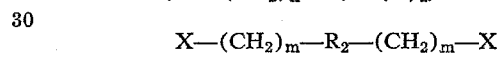

X—(CH$_2$)$_r$—R$_3$—(CH$_2$)$_r$—X can be used. In each of the above general formulas, X designates a chlorine, bromine or iodine atom, preferably a chlorine atom; R' is a monovalent or divalent radical of the type described with reference to R$_1$; R$_2$ is an oxygen atom, a sulfur atom or an imino radical; R$_3$ is a phenylene or naphthalene radical, an alkyl substituted phenylene or naphthalene radical having from 7 to 20 carbon atoms, preferably 7 to 10 carbon atoms, an oxygen or sulfur atom, or an imino radical; n is an integer ranging from 2 to 6 inclusive; m is an integer varying from 1 to 3 and r is an integer varying from 1–10.

Examples of useful organohalide compounds include: methylchloride, ethylbromide, hexylchloride, 1-chloro-3-butene, allylbromide, methallylchloride, 1-bromo-2,3-dimethyl-2-butene, 1,3-dichloro-2-butene, 1-chloro-5,5,7,7-tetramethyl - 2 - octene, propargyl bromide, cyclohexyliodide, benzylchloride, benzylidenechloride, 1,3-iodochloropropane, 1,4-dichlorobutane, chlorodiphenylurethane, 1,5-dibromooctane, 1 - chlorododecane, 2,4 - dimethylbenzyl chloride, 2-chloromethyl norbornene, 2-bromomethyl norbornene, 1 - bromoadamantane, alphachloromethylnaphthalene, beta ethyloxyethyl chloride, bis(2-bromoethyl)ether, gammaphenyloxypropyl bromide, etc.

The alkali metal salt forming reaction and the one-step alkylation reaction are conducted in the presence of a diorgano sulfoxide diluent. Optionally, the reaction of an alkali metal salt of an organonitrile carbanion with an organohalide may be conducted in the presence of a diluent other than a diorgano sulfoxide, e.g., lower alkyl alcohols; however, the reaction proceeds best when the reaction is conducted in the presence of the preferred diorgano sulfoxide diluent. From 5 to 60 weight percent, preferably 10 to 25 weight percent of the sulfoxide diluent, based upon the total weight of reactants and solvents, is used in all of the reactions contemplated hereunder. Useful diorgano sulfoxide materials include compounds having from 2–20, preferably 2–6, carbon atoms, such as dimethyl sulfoxide, diethyl sulfoxide, diphenyl sulfoxide, ethyl propyl sulfoxide, etc. The preferred solvent materials are dialkyl sulfoxides, in particular, dimethyl sulfoxide.

The relative molar ratios of the reactants employed to form either the alkali metal salts of an organonitrile carbanion or the alkylated nitrile compositions can vary over a relatively wide range. Typically, the molar ratio of nitrile to alkali metal hydroxide can vary from 1:1 to 1:10, preferably 1:1 to 1:5. The amount of alkali metal base used relative to the starting nitrile compound depends upon the number of abstractable hydrogen atoms contained on the carbon atom alpha to the nitrile group of the starting reagent and the number of hydrogen atoms sought to be replaced with alkali metal cations. Generally, from 1 to 5, preferably 1 to 1.5 moles of organohalide compound is used per mole of alkali metal present in the alkali metal carbanion salt intermediate.

In a typical reaction procedure, a dimethyl sulfoxide solution of the organonitrile and an aqueous solution of an alkali metal hydroxide are introduced into a rapidly stirred solution of an alkyl halide contained in dimethyl sulfoxide. The reaction is conducted within a pressure bottle or an ordinary glass flask. The temperature at which the one step alkaylation reaction is conducted and the temperatures used in processes for the formation of alkali metal salts or organonitrile carbanions or the alkylation of such alkali metal salts can vary from about 5° C. to the boiling point of the reaction mixture at the prevailing reaction zone pressure. In most instances, reaction temperature will vary from about 35° to 90° C. Since the reaction is generally exothermic, the reaction apparatus may be equipped with a cooling device. Reaction pressure is not critical; however, sufficient pressure should be employed when elevated temperatures are used in order to maintain liquid phase reaction conditions. Preferably, reaction zone pressure varies from about 1 to 2 atmospheres. The time of reaction, either to form the alkali metal salts of the organonitrile carbanion or the completed alkylated nitrile depends upon the nature of the process reagent and the degree of process conversion desired. Normally, substantial yields of a desired product are secured within from 15 minutes to 50 hours. The desired reaction products are recovered and further isolated from the reaction mixture using conventional procedures. In many instances, the alkylation product can be recovered by diluting the reaction mixture with water followed by simple filtration.

Various types of product materials can be secured with the instant process sequence. For example, (a) mono- or polysubstituted organic nitriles having the following representative formulae:

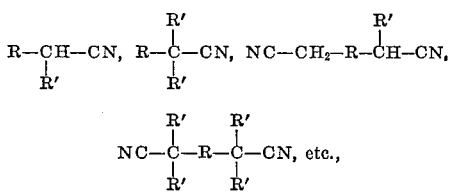

(b) carbocyclic and heterocyclic nitriles possessing the following representative formulae:

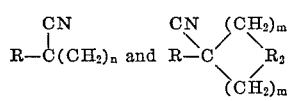

and (c) substituted dinitriles having the general formula:

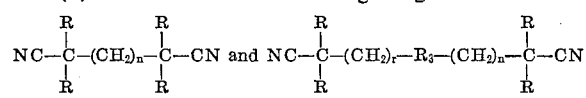

can be secured. These and other products produced with the instant processes exhibit many varied uses. For example, the alkali metal salts of an organonitrile carbanion are the precursors of the instant alkylated nitrile compositions. Similarly, the alkali metal salts may be hydrolyzed to alcohol materials that also possess utility as intermediates. The alkylated nitrile compositions can be employed as intermediates for plasticizers, synthetic polymers, fibers, alkyd resins, lubricating oil additives and pharmaceuticals. More specifically, a number of the difunctional nitriles can be converted to difunctional aromatic acids and complex esters that are useful as lubricating oil additives. The nitrile materials may also be reduced to the corresponding amine compositions through the catalytic hydrogenation of the nitriles. The compositions can be converted into the appropriate ester materials through alcoholysis reactions. The materials may be hydrolyzed to the corresponding acids through reactions with a base or an acid. The acid hydrolysis is carried out by heating the nitrile material with an acid such as hydrochloric acid, sulfuric acid, phosphoric acid or acetic acid. The metal salt of the acid can be made by the alkaline hydrolysis of the substituted nitrile. This is accomplished by heating the nitrile with an alkali metal hydroxide such as sodium or potassium hydroxide.

DESCRIPTION OF THE PREFERRED EMBODIMENTS

The following embodiments are submitted to more particularly point out the invention.

Example 1.—Preparation of alpha,alpha,alpha',alpha'-tetramethyl-p-phenylenediacetonitrile To demonstrate prior art procedures, the above-named compound was prepared using classic potassium amide in toluene techniques. In the experiment a dry, nitrogen-flushed reaction flask to which a Dry Ice-cooled condenser was attached was charged with 400 ml. of ammonia; then 0.5 gram of potassium metal was added. The blue solution was blown with dry air until the color was discharged. One-tenth of a gram of ferric nitrate was added. Stirring was commenced, and 21.7 grams of potassium was added in small portions over a period of thirty minutes. Ten minutes after the addition of potassium was completed, the blue color changed to dark brown. To this mixture was added dropwise 15.6 grams of p-phenylenediacetonitrile dissolved in 300 ml. of warm (ca. 60° C.) toluene. The Dry Ice-cooled condenser was removed and the ammonia was allowed to evaporate. The resulting brown mixture was heated at 75° C. for one hour, cooled to room temperature and 62.5 grams of methyl iodide diluted with 50 ml. of toluene was then added dropwise over a period of thirty minutes. The reaction mixture was stirred overnight, then heated at 80° C. for one additional hour and cooled. Ethanol (20 ml.) was added, followed by 200 ml. of water to dissolve the precipitated potassium iodide. The product was washed with dilute sodium bisulfite and sodium bicarbonate solutions and water. The solvent was evaporated, and the resulting solid recrystallized from absolute ethanol to give 12.1 grams (57% of theory) of colorless crystals, melting at 130° to 133° C. Elemental analysis, nuclear magnetic resonance and infrared spectra identified this material as alpha,alpha,alpha',alpha'-tetramethyl-p-phenylenediacetonitrile.

Example 2.—Preparation of alpha,alpha,alpha',alpha'-tetramethyl-p-phenylenediacetonitrile (with sodium hydroxide) in dimethyl sulfoxide A flask was charged with 1000 ml. of dimethyl sulfoxide and methyl chloride was introduced for thirty minutes. While methyl chloride was being added, 400 grams of 50% aqueous sodium hydroxide and a solution of 156 grams of p-phenylenediacetonitrile in 500 ml. of dimethyl sulfoxide was added. The addition of sodium hydroxide was complete after sixty minutes, while the phenylenediacetonitrile solution was added at such a rate that the temperature of the reaction was kept between 50° and 60° C. After the exothermic reaction had subsided, stirring and introduction of methyl chloride were continued for an additional sixty minutes. Upon completion of this period, the dark green-brown reaction mixture was poured into 3000 ml. of water. The precipitated light brown solid was separated, washed extensively with water and dried to give 188 grams (87% of theory) of crude, alpha,alpha,alpha',alpha'-tetramethyl-p-phenylenediacetonitrile, M.P. 128 to 133° C.

Example 3.—Preparation of alpha,alpha,alpha',alpha'-tetramethyl-p-phenylenediacetic acid and its anhydride (A) By alkaline hydrolysis.—A stirred mixture of 400 grams of alpha,alpha,alpha',alpha'-tetramethyl-p-phenylenediacetonitrile 400 grams of potassium hydroxide pellets, and 2500 ml. of ethylene glycol was refluxed until the ammonia evolution ceased (about 15 hours). After cooling, the solution was diluted with 10 liters of water and its pH adjusted to between 9 and 9.5 by addition of 50% aqueous sulfuric acid. The slightly brown solution was decolorized by boiling for 5 minutes with 100 grams of charcoal. The colorless filtrate was acidified with 50% aqueous sulfuric acid, and the white precipitate filtered, washed with water and dried. The crude alpha,alpha,alpha',alpha' - tetramethyl - p - phenylenediacetic acid weighed 350 grams (78% of theory), M.P. 263 to 265° C. Recrystallization from ethyl acetoacetate gave the pure acid, M.P. 269 to 270° C.

Sublimation of the diacid in a vacuum gave the alpha, alpha,alpha',alpha'-tetramethyl - p - phenylenediacetic acid anhydride, M.P. 277 to 278° C.

(B) Acid hydrolysis.—A stirred solution of 21.6 grams of tetramethylphenylenediacetonitrile in 100 ml. of concentrated hydrochloric acid and 250 ml. of glacial acetic acid was refluxed for thirty-five hours. After cooling, the mixture was poured into 200 ml. of water, the light brown precipitate collected and extracted with 100 ml. of 15% aqueous sodium hydroxide. The filtrate on acidification with 50% aqueous sulfuric acid gave 19.2 grams (77% of theory) of alpha,alpha,alpha',alpha'-tetramethyl-p-phenylenediacetic acid, which was found to be identical with the material obtained under (A) above.

Example 4.—Preparation of diethyl ester of alpha,alpha, alpha',alpha'-tetramethyl-p-phenylenediacetic acid To a solution of 20 grams of anhydrous hydrochloric acid in 100 ml. of ethanol was added 21.2 grams of alpha, alpha,alpha',alpha'-tetramethyl-p - phenylenediacetonitrile and the stirred mixture was refluxed for 18 hours. The resultant mixture was diluted with 100 ml. of water and filtered, washed with water, aqueous sodium bicarbonate solution, again with water, and then dried. The diethyl ester of alpha,alpha,alpha',alpha'-tetramethyl-p-phenylenediacetic acid, 25.3 grams (83% of theory) melted at 52 to 53° C.

Example 5.—Preparation of p-di(amino-t-butyl)benzene

Anhydrous ammonia was passed into 300 ml. of chilled absolute ethanol until 28 grams of the gas were absorbed. To this solution was added 40 grams of alpha,alpha, alpha',alpha'-tetramethyl - p - phenylenediacetonitrile and the mixture placed in a hydrogenation bomb, together with 2 grams of Raney nickel catalyst. Hydrogen was introduced until the pressure reached about 1500 pounds. The bomb was then heated at 125 to 130° C. and rocking was begun. The reduction was complete after about 60 minutes. The bomb was cooled and opened, and the contents were removed. The liquid was filtered from the catalyst and the solvent removed to leave 15.4 grams (70% of theory) of p-di(amino-t-butyl)benzene, M.P. 101 to 104° C.

Example 6.—Preparation of alpha,alpha-dimethylphenylacetonitrile

A flask was charged with 100 ml. of dimethyl sulfoxide and then methyl chloride was introduced for 15 minutes. While passage of methyl chloride was continued, there was simultaneously added with stirring 32 grams of 50% aqueous sodium hydroxide and 11.7 grams of phenylacetonitrile. The reactants were added at a rate such that the temperature of the exothermic reaction was kept between 45 and 50° C. After the exothermic reaction had subsided, stirring and introduction of methyl chloride were continued for an additional 60 minutes. Upon completion of this period, the contents of the reaction flask were diluted with 250 ml. of water and the aqueous mixture extracted with two 100 ml. portions of benzene and one 100 ml. portion of ether. The combined organic extracts were washed with saturated sodium bicarbonate solution, followed by saturated sodium chloride solution. After drying over anhydrous sodium sulfate, the solvents were evaporated, leaving 11.0 grams (76% of theory) of a yellowish oil. Analyses by vapor phase chromatography/time-of-flight spectroscopy, and by nuclear magnetic resonance proved this product to be pure alpha,alpha-dimethylphenylacetonitrile.

Example 7

A number of products were made utilizing the procedure of Example 6 with the reactants set forth in Table I below. In each case dimethyl sulfoxide was used as the solvent.

TABLE I

| Starting nitrile | Caustic | Halide | Substituted nitrile product |
| --- | --- | --- | --- |
| Phenylacetonitrile | NaOH | Methyl chloride | α-Methylphenylacetonitrile. |
| Do | NaOH | 1-propylchloride | α-(n-Propyl)phenylacetonitrile. |
| Do | NaOH | 1-chlorobutane | α-(n-Butyl)phenylacetonitrile. |
| Do | NaOH | 1-chloroheptane | α-(n-Heptyl)phenylacetonitrile. |
| Do | NaOH | 1-chloro-3-methyl butane | α-(i-Valero)acetonitrile. |
| Do | NaOH | Benzyl chloride | α,α'-Dibenzylphenylacetonitrile. |
| Do | NaOH | 2-chloro-N, N-diethylamine hydrochloride. | α-(N, N-diethylethylamino)phenylacetonitrile. |
| Malononitrile | NaOH | Methyl chloride | Dimethylmalononitrile. |

Example 8.—Preparation of α-allyldiphenylacetonitrile

To a stirred solution of 7.6 grams of 3-chloropropene in 100 ml. of dimethyl sulfoxide there was added, under nitrogen, simultaneously 16.0 grams of 50% aqueous sodium hydroxide and 19.3 grams of diphenylacetonitrile dissolved in 50 ml. of dimethyl sulfoxide. The reactants were added at a rate such that the temperature of the reaction did not exceed 50° C. After the exothermic reaction had subsided, stirring was continued for an additional 240 minutes. The reaction mixture was then diluted with 250 ml. of water and extracted with two 100 ml. portions of benzene. Evaporation of the solvent gave 20.0 grams of a yellow oil which was fractionated in vacuum to yield 17.6 grams (76%) of α-allyldiphenylacetonitrile, boiling at 145° C./0.4 mm. Hg pressure.

Example 9

A series of reactions were conducted in order to determine the efficacy of the process. Each was made in accordance with the procedure of Example 6. The results of these runs are set forth in Tables II through V. The reactions, the results of which are set forth in the aforesaid tables, show that various halides, bases and nitriles can be utilized in the instantly claimed process in various sequences.

TABLE II.—METHYLATION OF P-PHENYLENEDIACETONITRILE WITH METHYL HALIDES AND AQUEOUS ALKALI METAL HYDROXIDE IN DIMETHYL SULFOXIDE $$\underset{\text{I}}{NCCH_2C_6H_4CH_2CN} \xrightarrow[\text{(MOH)}]{+CH_3X} \underset{\text{II}}{NCCHCH_3C_6H_4CH_2CN} \xrightarrow[\text{(MOH)}]{+CH_3X} \underset{\text{III}}{NCCHCH_3C_6H_4CHCH_3CN} \xrightarrow[\text{(MOH)}]{+CH_3X} \underset{\text{IV}}{NC(CH_3)_2CC_6H_4CHCH_3CN} \xrightarrow[\text{(MOH)}]{+CH_3X} \underset{\text{V}}{NC(CH_3)_2CC_6H_4C(CH_3)_2CN}$$

| Methyl halide CH₃X | Base MOH | Conc. of MOH, percent | Mole equivalents of MOH | Maximum reaction temp., °C. | Percent composition of products [2,3] | | | | | |
|---|---|---|---|---|---|---|---|---|---|---|
| | | | | | Conversion,[1] percent | Unreacted I | II | III | IV | V |
| CH₃Cl | NaOH | 50 | 10 | 56 | 87 | | | | | >98 |
| CH₃Br | NaOH | 50 | 10 | 68 | 76 | | >>1 | >1 | 5 | 71 |
| CH₃Cl | NaOH | 50 | 10 | 40 | 88 | | | | | >98 |
| CH₃Cl | NaOH | 50 | 5 | 52 | 92 | | | | | 92 |
| CH₃Cl | NaOH | 50 | 10 | 58 | 91 | | | | | >98 |
| CH₃Cl | NaOH | 50 | 10 | 75 | 91 | | | | | >98 |
| CH₃Cl | NaOH | 50 | 2.5 | 42 | | | | | | |
| CH₃Cl | NaOH | 50 | 5 | 69 | 87 | | | | | >98 |
| CH₃Cl | NaOH | 50 | 5 | 35 | 92 | | | | 2 | 90 |
| CH₃Cl | NaOH | 50 | 5 | 67 | 82 | | | 9 | 31 | 60 |
| CH₃Cl | NaOH | 50 | 5 | [4]80 | 89 | | | | | >98 |
| CH₃Cl | NaOH | Powdered | 5 | 41 | 62 | 50 | 5 | 4 | 6 | 35 |
| CH₃Cl | KOH | 50 | 5 | 69 | 82 | | 2 | 8 | 8 | 82 |
| CH₃I | NaOH | 50 | 5 | 68 | 42 | 13 | 7 | 2 | >1 | 32 |
| CH₃Cl | NaOH | 45 | 5 | 60 | 82 | | | | 7 | 29 | 64 |
| CH₃Cl | NaOH | 40 | 5 | 52 | 91 | | | | | 98 |
| CH₃Cl | NaOH | 35 | 5 | 50 | 85 | | | | 8 | 92 |
| CH₃Cl | NaOH | 30 | 5 | 58 | 80 | | | 1 | 7 | 92 |

[1] Based on reacted I.
[2] The products were identified by nuclear magnetic resonance and by vapor phase chromatography/time-of-flight spectroscopy.
[3] The composition of products is determined by vapor phase chromatography.
[4] External heating applied.

TABLE III.—METHYLATION OF PHENYLACETONITRILE WITH EXCESS OF METHYL CHLORIDE IN DIMETHYL SULFOXIDE AND WITH VARYING CONCENTRATIONS OF ALKALI METAL HYDROXIDES $$\underset{\text{I}}{C_6H_5CH_2CN} \xrightarrow[\text{(MOH)}]{+CH_3Cl} \underset{\text{II}}{C_6H_5CHCH_3CN} \xrightarrow[\text{(MOH)}]{+CH_3Cl} \underset{\text{III}}{C_6H_5C(CH_3)_2CN}$$

| Base MOH | Concentration of MOH, percent | Mole equivalents of MOH | Maximum reaction temp., °C | Conversion, percent | Percent composition of product [1,2] | |
|---|---|---|---|---|---|---|
| | | | | | II | III |
| NaOH | 30 | 4.0 | 51 | 86 | 10 | 90 |
| NaOH | 35 | 4.0 | 47 | 70 | | >98 |
| NaOH | 40 | 4.0 | 38 | 83 | | >98 |
| NaOH | 45 | 4.0 | 48 | 87 | | >98 |
| KOH | 50 | 4.0 | 40 | [3]90 | | >98 |
| KOH | 50 | 3.0 | 51 | 94 | 34 | 66 |

[1] The products were identified by nuclear magnetic resonance and by vapor phase chromatography/time-of-flight spectroscopy.
[2] The composition of products was determined by vapor phase chromatography.
[3] Based on reacted I.

TABLE IV.—ALKYLATION OF PHENYLACETONITRILE WITH METHYL HALIDES AND 50% AQUEOUS SODIUM HYDROXIDE IN DIMETHYL SULFOXIDE $$\underset{\text{I}}{C_6H_5CH_2CN} \xrightarrow[\text{(NaOH)}]{+CH_3X} \underset{\text{II}}{C_6H_5CHCH_3CN} \xrightarrow[\text{(NaOH)}]{+CHX} \underset{\text{III}}{C_6H_5C(CH_3)_2CN}$$

| Alkylating agent, CH₃X | Mole equivalents of— | | Maximum reaction Temp., °C. | Conversion, percent | Percent composition of products [1,2] | | |
|---|---|---|---|---|---|---|---|
| | CH₃X | NaOH | | | I | II | III |
| CH₃Cl | Excess | 10.0 | 56 | 61 | | | >98 |
| CH₃Cl | do | 5.0 | 50 | 79 | | 1 | 99 |
| CH₃Cl | do | 2.5 | 47 | 75 | 4 | 22 | 74 |
| CH₃Cl | do | 1.25 | 48 | 73 | 27 | 18 | 55 |
| CH₃Cl | do | 7.5 | 48 | 69 | | | 99 |
| CH₃Cl | do | 4.0 | 50 | 76 | | 1 | 99 |
| CH₃I | 3 | 4.0 | 59 | 65 | | 1 | 99 |
| CH₃I | 4 | 4.0 | 63 | 46 | 36 | 15 | 49 |
| CH₃Br | Excess | 4.0 | 63 | 71 | 44 | 25 | 31 |
| CH₃Cl | do | 4.0 | 61 | 90 | 2 | | 98 |
| CH₃Cl | do | 4.0 | 35 | 81 | | | 99 |
| CH₃Cl | do | 4.0 | 73 | 92 | | | 92 |
| CH₃I | 3 | 10.0 | 62 | 59 | 68 | 10 | 22 |

[1] The products were identified by nuclear magnetic resonance and by vapor phase chromatography/time-of-flight mass spectroscopy.
[2] The composition of products was determined by vapor phase chromatography.

TABLE V.—ALKYLATION OF PHENYLACETONITRILE WITH ALKYL HALIDES AND 50% AQUEOUS ALKALI METAL HYDROXIDE IN DIMETHYL SULFOXIDE $$\text{I} \quad\quad\quad\quad \text{II} \quad\quad\quad\quad \text{III}$$
$$C_6H_5CH_2CN \xrightarrow[\text{(MOH)}]{+RX} C_6H_5CHRCN \xrightarrow[\text{(MOH)}]{+RX} C_6H_5CR_2CN$$

| Alkylating agent RX | Mole equivalents of RX | Base MOH | Mole equivalents of MOH | Maximum reaction temp., °C. | Conversion, percent | Percent composition of product— II | III |
|---|---|---|---|---|---|---|---|
| n-C$_3$H$_7$Cl | 3.00 | NaOH | 4.0 | 35 | 61 | [1] 35 | [1] 65 |
| n-C$_3$H$_7$Br | 1.25 | NaOH | 5.0 | [2] 50 | 47 | 76 | |
| n-C$_3$H$_7$Cl | 1.25 | NaOH | 4.0 | [2] 58 | 90 | [1] 25 | [1] 75 |
| n-C$_4$H$_9$Cl | 2.50 | KOH | 4.0 | 26 | 69 | 90 | |
| n-C$_7$H$_{15}$Cl | 3.00 | NaOH | 4.0 | 39 | 51 | 43 | 57 |
| i-C$_5$H$_{11}$Cl | 3.00 | NaOH | 4.0 | 36 | 36 | [1] 38 | [1] 42 |
| C$_6$H$_5$CH$_2$Cl | 3.00 | NaOH | 4.0 | 52 | 98 | | >98 |
| (C$_2$H$_5$)$_2$NCH$_2$CH$_2$Cl | 0.75 | NaOH | 5.0 | 40 | 38 | 28 | |

[1] Separated and identified by vapor phase chromatography.
[2] Heated externally.

Example 10.—Preparation of 1-cyano-1-phenyl-cyclohexane

To a stirred solution of 23 grams of 1,5-dibromopentane in 100 ml. of dimethyl sulfoxide was added under nitrogen simultaneously 16 grams of 50% aqueous sodium hydroxide and 11.7 grams of diphenylacetonitrile dissolved in 50 ml. of dimethyl sulfoxide. The temperature of the reaction did not exceed 50° C. After the exothermic reaction had subsided, stirring was continued for an additional 4 hours. The reaction mixture was diluted with water and extracted with benzene. The solvent was evaporated and the resulting oil was fractionated in a vacuum to yield 9 grams of 1-cyano-1-phenylcyclohexane boiling at 97° C at 0.3 mm. Hg.

Example 11.—Preparation of 4-phenyl-4-cyano-tetrahydropyran

Following the procedure of Example 10, 11.7 grams of phenylacetonitrile was reacted with 14.3 grams of bis-(2-bromoethyl)ether in the presence of sodium hydroxide and dimethyl sulfoxide to give 5.9 grams of 4-phenyl-4-cyano-tetrahydropyran boiling at 95° C. at 0.2 mm. Hg.

Example 12.—Preparation of 2,2,6,6-tetraphenyl-pimelonitrile

Following the procedure of Example 11, diphenylacetonitrile was reacted with 1,3-dibromopropane in the presence of sodium hydroxide and dimethyl sulfoxide to produce 2,2,6,6-tetraphenylpimelonitrile melting at 113° to 114° C. This product was isolated as long white rods.

Example 13

Following the procedure of Example 10, 13.2 grams of p-aminophenylacetonitrile was reacted with 23.0 grams of 1-chlorobutane in the presence of sodium hydroxide and dimethyl sulfoxide to give 7.1 grams of alpha,alpha-di(n-butyl)-(p-aminophenyl)acetonitrile having a boiling point of 145–155° C. at 2.5 mm. of mercury pressure.

Example 14

Following the procedure of Example 10, 19.3 grams of biphenylylacetonitrile was reacted with 23.0 grams of 1-chlorobutane in the presence of sodium hydroxide and dimethylsulfoxide to give 22.0 grams of alpha,alpha-di(n-butyl)-(biphenylyl)acetonitrile. The product exhibited a melting point at 55–58° C.

Example 15

Following the procedure of Example 10, 13.1 grams of 3-methylphenylacetonitrile was reacted with 19.5 grams of 1-chloropropane in the presence of sodium hydroxide and dimethylsulfoxide to give 16.3 grams of alpha,alpha-di-n-propyl-3-methylphenylacetonitrile which boiled at 115–125° C. at 3.5 mm. of mercury pressure.

Example 16

Following the procedure of Example 10, 15.2 grams of 3-chlorophenylacetonitrile was reacted with 26.5 grams of 1-chloro-3-methylbutane in the presence of sodium hydroxide and dimethylsulfoxide to give 24.3 grams of alpha,alpha - di(isobutyl)-3-chlorophenylacetonitrile boiling at 160–170° C. at 4 mm. of mercury pressure.

Example 17

Following the procedure of Example 10, 5.0 grams of 4-hydroxyphenylacetonitrile was reacted with 8.7 grams of 1-chlorobutane in the presence of sodium hydroxide and dimethylsulfoxide to give 2.6 grams of alpha,alpha-di(n-butyl)-4-hydroxyphenylacetonitrile. The compound boiled at 179–186° C. at 7 mm. of mercury pressure.

Example 18

Following the procedure of Example 10, 25.0 grams of 1-chlorododecane was reacted with 8.8 grams of 3,4-dimethoxyphenylacetonitrile in the presence of sodium hydroxide and dimethylsulfoxide to give 26.9 grams of alpha-dodecyl - 3,4 - dimethoxyphenylacetonitrile which melts at 60° C.

What is claimed is:

1. A process for producing alkylated nitrile compositions which comprises contacting an organonitrile composition selected from the group consisting of phenylacetonitrile,
diphenylacetonitrile,
p-aminophenylacetonitrile,
biphenylacetonitrile,
3-bromo-phenylacetonitrile,
cyclohexylphenylacetonitrile,
2,6-dichlorophenylacetonitrile,
(3,4-dimethoxyphenyl)-acetonitrile,
alpha-(2-dimethylaminoethyl)-benzyl cyanide,
m-fluorophenylacetonitrile,
4-hydroxybenzylcyanide,
4-methoxybenzylcyanide,
2-methylbenzylcyanide,
p-nitrobenzylcyanide,
phenyl-2-pyridylacetonitrile,
3-pyridylacetonitrile,
alpha-phenylbutyronitrile,
p-phenylenediacetonitrile,
alpha-alpha'-dimethyl-p-phenylenediacetonitrile,
alpha-alpha-alpha'-trimethyl-p-phenylenediacetonitrile,
alpha-naphthylacetonitrile, with an organohalide material having the general formula selected from the group consisting of R'X, X(CH$_2$)$_n$—X, R'(X)$_2$ and X—(CH$_2$)$_m$—R$_2$—(CH$_2$)$_m$—X wherein R' is a monovalent radical selected from the group consisting of C$_3$–C$_{12}$ monovalent alicyclic alkyl radicals, aralkyl radicals having from 7 to 12 carbon atoms, alkylaryl radicals having from 7 to 12 carbon atoms and beta-diethylamino alkyl radicals having from 4 to 10 carbon atoms, R$_2$ is selected from the group consisting of an oxygen atom, a sulfur atom, and an imino radical, $n$ is an integer ranging from 2 to 6 inclusive, $m$ is an integer ranging from 1 to 3 and X is a chlorine, bromine or iodine atom; together with an aqueous solution of an alkali metal hydroxide and in the presence of a dialkyl sulfoxide solvent having from 2 to 6 carbon atoms; said contacting conducted at a temperature ranging from about 5° C. to the boiling point of the mixture and thereafter recovering a yield of said alkylated nitrile compositions.

2. The process of claim 1 wherein said organohalide has the general formula R'X wherein R' is selected from the group consisting of $C_3$–$C_{12}$ monovalent alicyclic alkyl radicals, aralkyl radicals having from 7 to 12 carbon atoms, alkylaryl radicals having from 7 to 12 carbon atoms and beta-diethylaminoalkyl radicals having from 4 to 10 carbon atoms and X is selected from the group consisting of chlorine and bromine atoms.

3. The process of claim 1 wherein said organohalide is a compound having the general formula $X(CH_2)_n$—X wherein $n$ is an integer ranging from 2 to 6 and X is selected from the group consisting of chlorine and bromine atoms.

4. The process of claim 1 wherein said organohalide is a compound having the general formula $$X-(CH_2)_m-R_2-(CH_2)_m-X$$

wherein $m$ is an integer ranging from 1 to 3, $R_2$ is selected from the group consisting of an oxygen atom, sulfur atom, imino radical and X is selected from the group consisting of chlorine and bromine atoms.

5. The process of claim 1 wherein said organohalide is further selected from the group consisting of methyl chloride, 1-propylchloride, 1-chlorobutane, benzyl chloride, 2 - chloro-N,N-diethylamine hydrochloride, and 2-chloropropene.

6. The process of claim 1 wherein said organonitrile is further selected from the group consisting of p-phenylene-diacetonitrile, phenylacetonitrile, diphenylacetonitrile, malononitrile, p-aminophenylacetonitrile, biphenylacetonitrile, 3-methylphenylacetonitrile, 3-chlorophenylacetonitrile, 4-hydroxyphenylacetonitrile, and 3,4-dimethoxyphenylacetonitrile.

7. The process of claim 1 wherein said organonitrile composition is phenylacetonitrile.

8. The process of claim 1 wherein said organonitrile composition is p-phenylenediacetonitrile.

9. The process of claim 1 wherein said reaction is conducted at a temperature ranging from 35 to 90° C.

10. The process of claim 1 wherein said dialkyl sulfoxide is dimethyl sulfoxide.

11. The process of claim 1 wherein said X is a chlorine atom.

12. The process of claim 1 wherein the alkali metal hydroxide is sodium hydroxide.

References Cited

UNITED STATES PATENTS

| | | | |
|---|---|---|---|
| 2,242,575 | 5/1941 | Eisleb | 260—345.1 |
| 2,885,404 | 5/1959 | Petrow et al. | 260—465 X |
| 3,413,309 | 11/1968 | Makosza et al. | 260—465 X |
| 3,485,873 | 12/1969 | Aceto et al. | 260—465 X |

OTHER REFERENCES

Parker: Quarterly Reviews, vol. 16, pp. 182–3 relied upon (1962).

LEWIS GOTTS, Primary Examiner

D. H. TORRENCE, Assistant Examiner

U.S. Cl. X.R.

239 R, 239 B, 294.9, 327 R, 329 R, 333, 326. 62, 346.1, 464, 465 E, 465 F, 465 G, 465 H, 465.1, 465.5, 465.8, 465.9, 475 SC, 515 P, 546, 558, 570.8